(12) United States Patent
Willits et al.

(10) Patent No.: US 11,249,684 B2
(45) Date of Patent: Feb. 15, 2022

(54) COMPUTATION OF SOLUTION TO SPARSE MATRIX

(71) Applicant: Raytheon Company, Waltham, MA (US)

(72) Inventors: Mike W. Willits, Sahuarita, AZ (US); Elliot Schwartz, Tucson, AZ (US); Scott R. Selnick, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/881,827

(22) Filed: May 22, 2020

(65) Prior Publication Data
US 2021/0365212 A1 Nov. 25, 2021

(51) Int. Cl.
| | | |
|---|---|---|
| G06F 13/00 | (2006.01) | |
| G06F 3/06 | (2006.01) | |
| G06F 17/16 | (2006.01) | |
| G06F 13/28 | (2006.01) | |

(52) U.S. Cl.
CPC .......... *G06F 3/0659* (2013.01); *G06F 3/0604* (2013.01); *G06F 3/0673* (2013.01); *G06F 13/28* (2013.01); *G06F 17/16* (2013.01)

(58) Field of Classification Search
CPC ...... G06F 3/0659; G06F 13/28; G06F 3/0673; G06F 17/16; G06F 3/0604
See application file for complete search history.

(56) References Cited

U.S. PATENT DOCUMENTS

| | | | | |
|---|---|---|---|---|
| 9,001,924 | B1 * | 4/2015 | Wu | G06F 17/16 375/295 |
| 9,912,349 | B1 * | 3/2018 | Ouyang | G06F 17/16 |
| 2004/0218681 | A1 * | 11/2004 | McNeely | H04L 27/2647 375/260 |
| 2017/0084088 | A1 * | 3/2017 | Reichardt | G05B 15/02 |
| 2017/0318119 | A1 * | 11/2017 | Zbiljic | H04L 67/2847 |

(Continued)

FOREIGN PATENT DOCUMENTS

| | | | |
|---|---|---|---|
| CN | 102662623 A | * | 9/2012 |
| CN | 105635909 A | * | 6/2016 |

(Continued)

OTHER PUBLICATIONS

Wu et al., "FPGA Accelerated Parallel Sparse Matrix Factorization for Circuit Simulations", International Symposium on Applied Reconfigurable Computing, ARC 2011: Reconfigurable Computing: Architectures, Tools and Applications, Belfast, UK, Mar. 23-25, 2011, pp. 302-315. (Year: 2011).*

(Continued)

*Primary Examiner* — Jing-Yih Shyu
(74) *Attorney, Agent, or Firm* — Schwegman Lundberg & Woessner, P.A.

(57) ABSTRACT

Discussed herein are devices, systems, and methods for efficient sparse matrix factorization. A method can include writing matrix data representing a sparse matrix to a memory, after writing the matrix data to the memory, write data to a control register of a field programmable gate array (FPGA) indicating the matrix data is available for factorization, and in response to either of (i) reading a status register indicating that the FPGA has factorized the matrix data, or (ii) receiving a software interrupt indicating that the FPGA has factorized the matrix data, determining a solution to a linear system of equations represented by the sparse matrix.

17 Claims, 5 Drawing Sheets

(56) References Cited

U.S. PATENT DOCUMENTS

| | | | |
|---|---|---|---|
| 2018/0095935 A1* | 4/2018 | Ben-Dayan Rubin | G06F 17/16 |
| 2019/0004997 A1* | 1/2019 | Cohen | G06F 17/16 |
| 2019/0179868 A1* | 6/2019 | Mir Ahmadi | G06F 17/16 |
| 2021/0097130 A1* | 4/2021 | Liu | G06N 3/0454 |

FOREIGN PATENT DOCUMENTS

| | | | | |
|---|---|---|---|---|
| CN | 106022382 A | | 10/2016 | |
| CN | 109740114 A | * | 5/2019 | |
| IN | 202924 B | | 2/2007 | |
| WO | WO-2020081543 A1 | * | 4/2020 | C12Q 1/6886 |

OTHER PUBLICATIONS

Jaiswal et al., "FPGA-Based High-Performance and Scalable Block LU Decomposition Architecture", IEEE Transaction of Computers, vol. 61, No. 1, Jan. 2012, pp. 60-72. (Year: 2012).*

Zhuo et al., "High-Performance and Parameterized Matrix Factorization on FPGAs", IEEE 2006, 2006 International Conference on Field-Programmable Logic and Applications, Madrid, Spain, Aug. 28-30, 2006 (Year: 2006).*

Wang et al., "Parallel LU Factorization of Sparse Matrices on FPGA-Based Configurable Computing Engines", Concurrency and Computation: Practice and Experience, 16(4), Apr. 2004, pp. 319-343. (Year: 2004).*

Johnson et al., "Sparse LU Decomposition using FPGA", International Workshop on State-of-the-Art in Scientific and Parallel Computing (PARA) May 13-16, 2008. (Year: 2008).*

Ren et al., "Sparse LU Factorization for Parallel Circuit Simulation on GPU", DAC 2012, Jun. 3-7, 2012, San Francisco, CA, USA. (Year: 2012).*

Choi et al., "Time and Energy Efficient Matrix Factorization Using FPGAs", International Conference on Field Programmable Logic and Applications, FPL 2003: Field Programmable Logic and Application, Sep. 1-3, 2004, Lisbon, Portugal, pp. 507-519. (Year: 2004).*

* cited by examiner

COMPUTATION OF SOLUTION TO SPARSE MATRIX

TECHNICAL FIELD

Embodiments discussed regard devices, systems, and methods for reducing time, compute resources consumed, or a combination thereof, for a computing device to compute a factorization of a sparse matrix that can be used to determine a solution to a problem that can be represented by a sparse matrix.

BACKGROUND

A sparse indefinite matrix is both sparse and indefinite. Sparse means that most (greater than 50%) of the entries in the matrix are zero. The definiteness of a matrix can be determined based on its eigenvalues. A matrix is said to be positive definite if all of its eigenvalues are positive ($\lambda_i>0$). A matrix is said to be positive semi-definite if all of its eigenvalues are greater than or equal to 0 ($\lambda_i \geq 0$). A matrix is said to be negative definite if all of its eigenvalues are negative ($\lambda_i<0$). A matrix is said to be negative semi-definite if all of its eigenvalues are less than or equal to 0 ($\lambda_i \leq 0$). A matrix is said to be indefinite if it is neither positive definite, positive semi-definite, negative definite, nor negative semi-definite. Said another way, a matrix is indefinite if it includes at least one positive eigenvalue and at least one negative eigenvalue.

DETAILED DESCRIPTION

Embodiments provide methods, systems, devices, and computer-readable media for processing a sparse matrix. The matrix can have any definiteness (e.g., positive or negative definite, positive or negative semi-definite, or indefinite).

Processing a non-linear optimization problem or factorization can use multiple parallel computing resources. Even with the parallel computing resources, the non-linear optimization problem or factorization can require too much time. The complexity of the solution using the parallel computing resources can be $O(N^3)$, where N is the number of variables (columns) in the sparse matrix. Too much time means that the solution is not determined fast enough to make a decision in a real time scenario. By the time the decision is made, the environment has changed so much that the solution may no longer be valid. The complexity means that a larger number of compute resources situated in parallel can be required to get a solution in less time. This makes the footprint of the circuitry for solving the non-linear optimization quickly can be prohibitively large, such as to make a device housing the circuitry prohibitively large. This is at least in part because, as the number of variables (sometimes called the problem space) increases, the number of parallel resources required to solve the problem in the same amount of time increases.

Embodiments provide a solution that uses a configurable logic device (e.g., a field programmable gate array (FPGA) with a processor (a central processing unit (CPU)). The configurable logic device and the processor can operate together to share at least a portion of a memory space. This configuration can be dedicated to determining a solution to the sparse matrix.

Applications of embodiments can include anything that requires real-time processing of a solution of a sparse linear system of equations. Examples of such applications include image processing, trajectory optimization, mission planning, machine learning (e.g., data set training), simulations, among many others.

Typically, to solve an optimal control problem using a direct pseudospectral collocation method and interior point optimization, a large sparse matrix technique can be used. The large sparse matrix technique can use large loop matrix operations, a compressed column form to reduce memory space, and are computationally intensive in terms of time and compute resource required.

Figure 1:
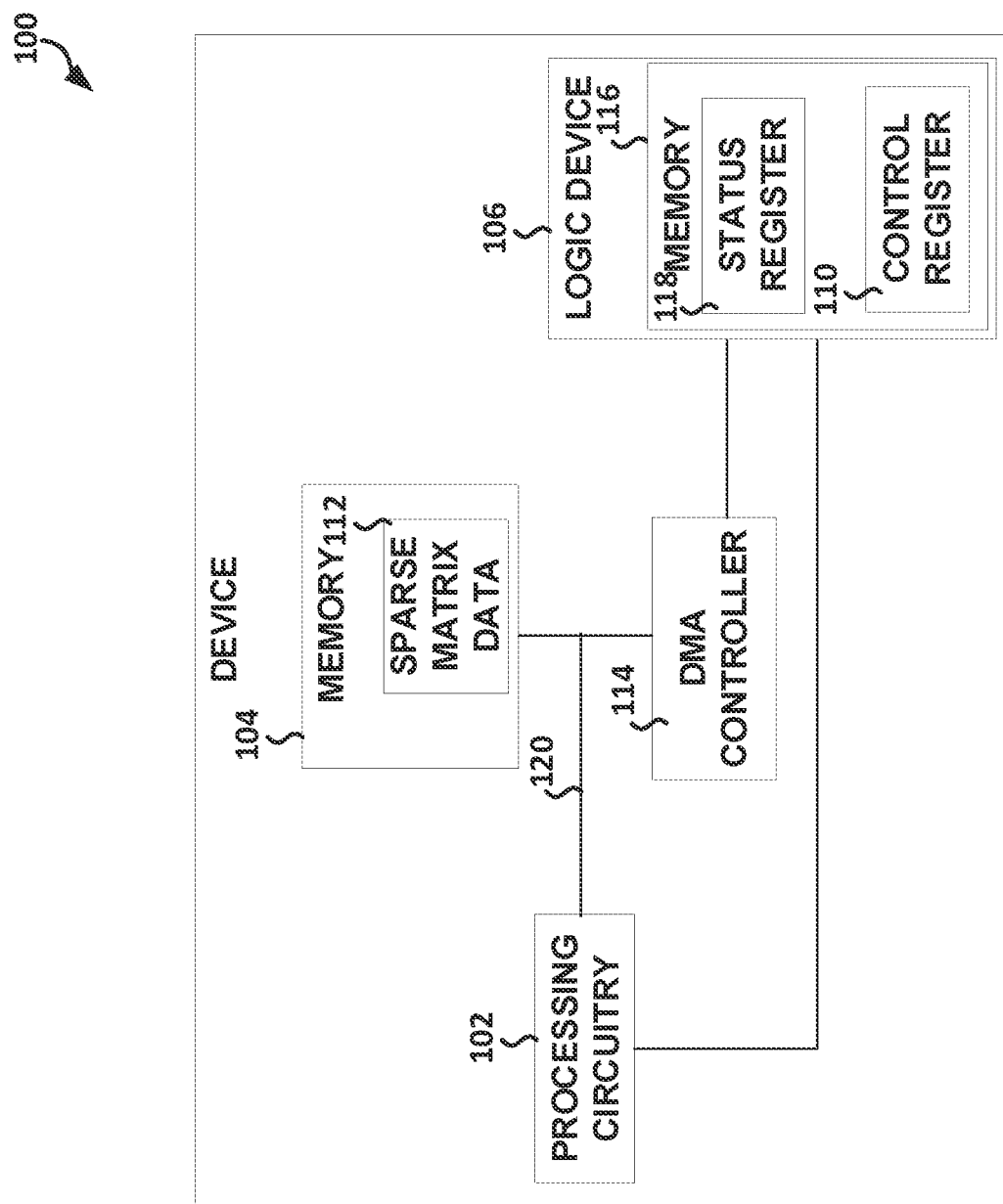
FIG. 1 illustrates, by way of example, a diagram of an embodiment of a system for improved computation of a solution to a sparse matrix.

FIG. 1 illustrates, by way of example, a diagram of an embodiment of a system 100 for improved computation of a solution to a sparse matrix. The system 100 as illustrated includes processing circuitry 102, a memory 104, and a logic device 106. The processing circuitry 102, can include electric or electronic components configured to perform operations of the component. The electric or electronic components can include one or more transistors, resistors, capacitors, diodes, inductors, logic gates (e.g., AND, OR, XOR, negate, buffer, or the like), power supplies, voltage, current, or power regulators, analog to digital converters, digital to analog converters, modulators, demodulators, amplifiers, a processing unit (e.g., a central processing unit (CPU), an application specific integrated circuit (ASIC), or the like), or the like.

The processing circuitry 102 can manage operation of the system 100. The processing circuitry 102 can cause the system 100 to perform an operation based on a result of sparse matrix factorization. The processing circuitry 102 can manage operation of the logic device 106, such as by, writing to a control register 110 of a memory 116. The processing circuitry 102 can check a status of operations performed by the logic device 106, such as by reading contents of a status register 118 of the memory 116 of the logic device 106.

The memory 104 can include random access memory (RAM), read only memory (ROM), a hard drive, compact disc, or the like. The memory 104 can include or be communicatively coupled to a direct memory access (DMA) controller 114, a control register 110, and sparse matrix data 112 that represents a multivariate problem to be solved.

The DMA controller 114 can transfer blocks of data from the memory 104 to the logic device 106 with little or no intervention from the processing circuitry 102. The DMA controller 114 provides an interface between a control bus 120 and the logic device 106. Although the DMA control 114 can transfer data without intervention of the processing circuitry 102, the DMA controller 114 is controlled by the processing circuitry 102. The processing circuitry 102 can initiate the DMA controller 114 by sending a starting address, number of words in the data block and direction of transfer of data (e.g., from the logic device 106 to the memory 104 or from the memory 104 to the logic device 106).

The DMA controller 114 can include an address unit. The address unit can generate addresses and select the device to receive a data transfer. The DMA controller 114 can also include the control unit and data count for keeping counts of the number of blocks transferred and indicating the direction of transfer of data. When the transfer is completed, the DMA contract 14 can inform the processing circuitry 102, such as by raising an interrupt.

After assigning the data transfer task to the DMA controller 114, the processing circuitry 102 can resume application execution instead of waiting until completion of the data transfer task.

After the DMA controller 114 has full control of the bus 120 (from the processing circuitry 102), it can interact directly with the memory 104 and the logic device 106 independent of the processing circuitry 102, The DMA controller 114 can make the data transfer according to the control instructions issued by the processing circuitry 102, After completion of data transfer between the logic device 106 and the memory 104, the DMA controller 114 can disable a bus request signal and the processing circuitry 102 can disable the bus grant signal thereby moving control of bus 120 to the processing circuitry 102.

When the logic device 106 wants to initiate a transfer of data to the memory 104, the logic device 106 can send a DMA request signal to the DMA controller 114, The DMA controller 114 can acknowledge if the bus 120 is free. Then the DMA controller 114 can request control of the bus 120 from the processing circuitry 102, such as by raising a bus request signal. After receiving a bus grant signal from the processing circuitry 102, the DMA controller 114 can transfer the data from the logic device 106 to the memory 104.

The processing circuitry 102 can write the sparse matrix data 112 to a portion of the memory 104 dedicated to DMA. The processing circuitry 102 can write to a control register 110 of the logic device 106. The data written to the control register 110 can indicate that the sparse matrix data 112 is in the memory 104. The data written to the control register 110 can indicate that the logic device 106 is to retrieve the sparse matrix data 112.

The logic device 106 can include a configurable array of logic gates (e.g., a field programmable gate array (FPGA)) or a dedicated array of logic gates (e.g., AND, OR, XOR, negate, buffer, or the like) configured to perform matrix factorization. The connectivity of the logic gates can be configured using a very high speed integrated circuit (VHSIC) hardware description language (VHDL). The VHDL language allows one to model a logic circuit using a software language and test the design to ensure proper operation. Since VHDL is a logic gate description, the operation description is of a concurrent system in which every statement at a given gate level is considered for execution simultaneously. This greatly increases the speed over software type solutions that run instructions sequentially per clock cycle. Since the processing performed by a logic gate can be much faster than a clock cycle, the processing performed by the logic device 106 can be much quicker than a software solution, a graphics processing unit (GPU) solution, or a parallel CPU solution.

The logic device 106, by the DMA controller 114, can retrieve the sparse matrix data 112. The logic device 106 can then perform sparse matrix factorization on the sparse matrix data 112. After the logic device 106 is done processing the sparse matrix data 112, the logic device 106 can request access to the bus 120, by way of the DMA controller 114. The logic device 106 can then write the results to the memory 104, such as over the sparse matrix data 112. After the write is complete (after the logic device 106 receives an acknowledgement of a successful write from the DMA controller 114) the logic device 106 can alter a bit of a status register 118 of the memory 116.

The processing circuitry 102 can poll the status register 118 to determine whether the logic device 106 has completed factorization on the sparse matrix data 112. After the data written to the status register 118 indicates the processing is complete, the processing circuitry 102 can retrieve the factorization results. The processing circuitry 102 can then determine an operation to be performed based on the factorization results.

Figure 2:
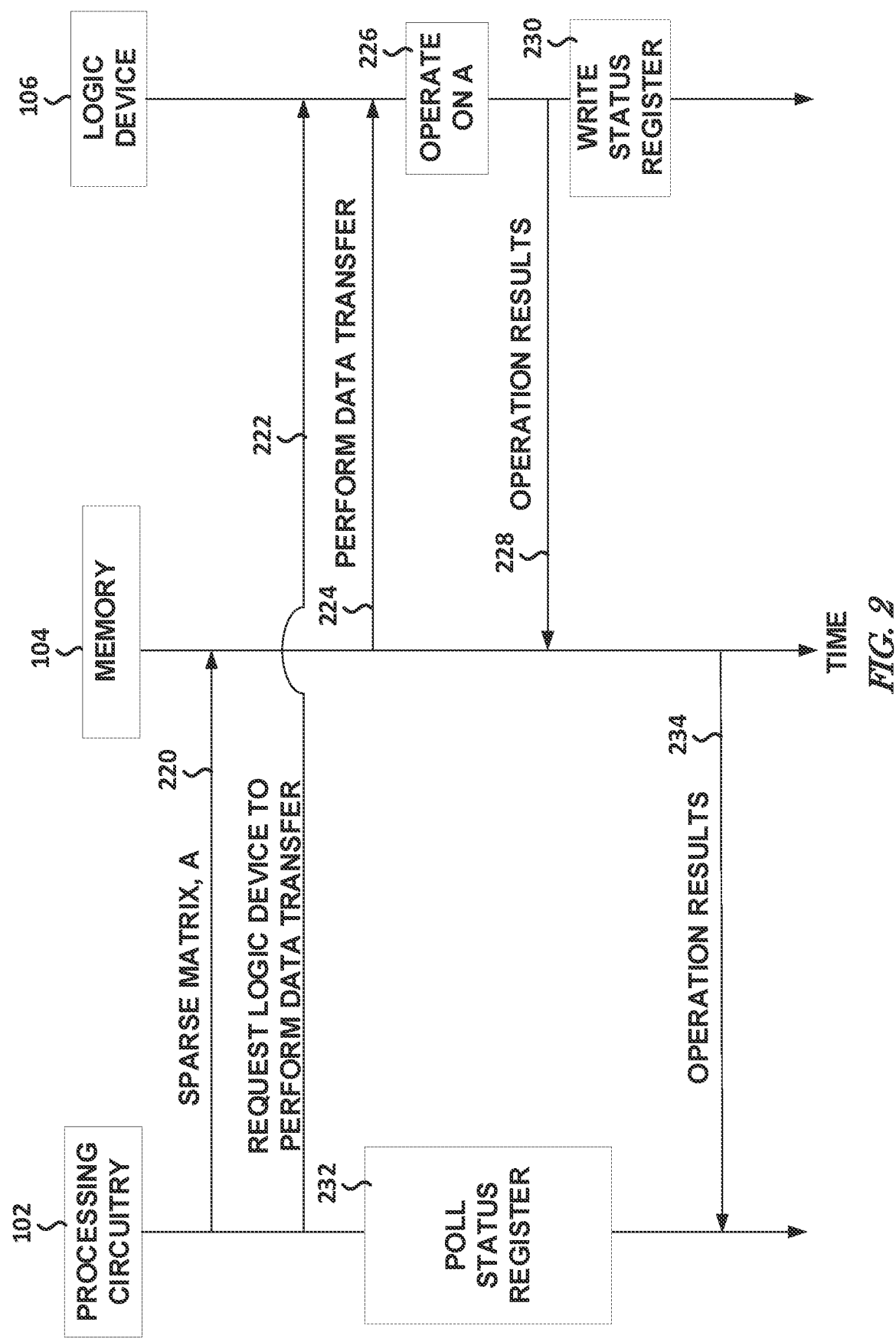
FIG. 2 illustrates, by way of example, a communication diagram for improved solutions for matrix factorization.

FIG. 2 illustrates, by way of example, a communication diagram for improved solutions for matrix factorization. The communication diagram includes communications between the processing circuitry 102, the memory 104, and the logic device 106. While the communication diagram includes communications directly between the memory 104 and the logic device 106, embodiments with DMA capability can be understood to include the communications between the memory 104 and the logic device 106 by way of the DMA controller 114.

The processing circuitry 102 can determine that it needs a matrix factorization of a sparse matrix, A. The processing circuitry 102 can write the sparse matrix, A to the memory 104 at operation 220. The sparse matrix can be provided in compressed form, at operation 220. Compressed form can include compressed column format or other suitable compression. Compressed column format is a storage format for sparse matrices, and only stores the nonzero elements of the sparse matrix along with location data. Compressed column means that all the nonzero rows with a single column are stored contiguously.

The processing circuitry 102 can request the logic device 106 perform sparse matrix factorization, at operation 222. The operation 222 can include the processing circuitry 102 writing a specified data value to the control register 110 of the logic device 106. At operation 224, the memory 104 (the DMA controller 114 coupled to the memory 104) can perform a data transfer of the sparse matrix, A.

The logic device 106 can perform matrix factorization on the sparse matrix at operation 226. More details regarding matrix factorization are provided elsewhere herein. The operations 226 can include a nonlinear optimization technique discussed elsewhere herein. The logic device 106 can be configured (e.g., via VHDL or the like) to perform the nonlinear optimization technique.

The results of performing the nonlinear optimization technique can be written to the memory 104 (e.g., via the DMA controller 114), at operation 228. Concurrent with, or after the operation 228, the logic device 106 can write a data value to the status register 118 indicating the results are in the memory 104, at operation 230.

Sometime after the operation 222, the processing circuitry 102 can poll the status register 118, at operation 232. The operation 232 can occur periodically, at a specified amount of time after the operation 222, after the processing circuitry 102 performs other operations (related or unrelated to the sparse matrix, A), or the like. The operation 232 can occur concurrently with the operations 226, 228, 230, In some embodiments, the DMA controller 114 can issue an interrupt to the processing circuitry 102. The interrupt can indicate to the processing circuitry 102 that the results of the matrix factorization are available in the memory 104. At operation 234, the operation results are provided to the processing circuitry 102. The operation results can include L, D, $D_{inv}$, P and S, as discussed below.

Figure 3:
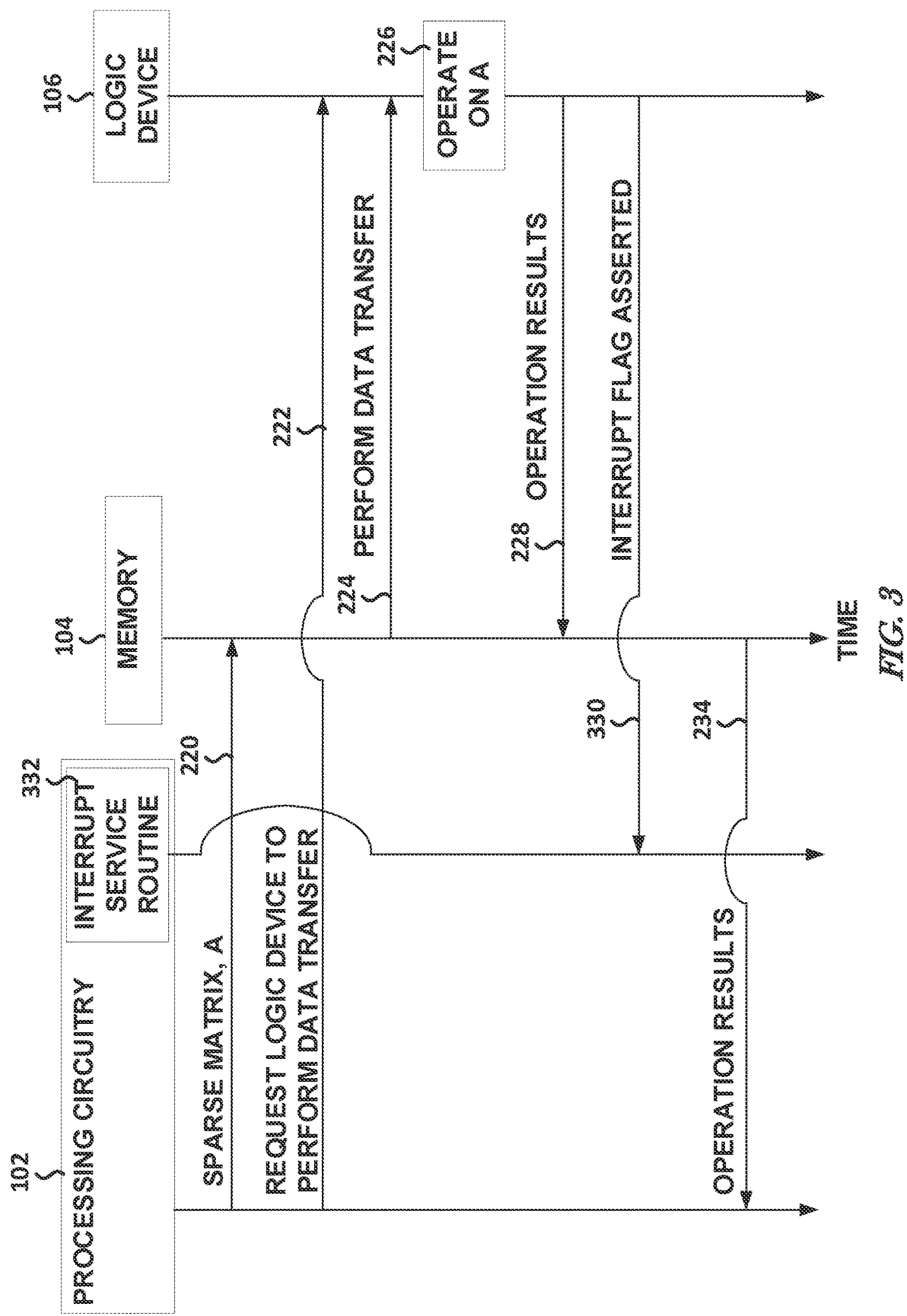
FIG. 3 illustrates, by way of example, another communication diagram for improved solutions for matrix factorization.

FIG. 3 illustrates, by way of example, another communication diagram for improved solutions to matrix factorization. The communication diagram of FIG. 3 is similar to the communication diagram of FIG. 2, with FIG. 3 including a hardware to software interrupt service routine (ISR) solution instead of a software solution provided in FIG. 2. The communication diagram includes communications between the processing circuitry 102, an ISR 332 of the processing circuitry 102, the memory 104, and the logic device 106. While the communication diagram includes communications directly between the memory 104 and the logic device 106, embodiments with DMA capability can be understood to include the communications between the memory 104 and the logic device 106 by way of the DMA controller 114.

The processing circuitry 102 can determine that it needs a matrix factorization of a sparse matrix, A. The processing circuitry 102 can write the sparse matrix, A to the memory 104 at operation 220. The sparse matrix can be provided in compressed form, at operation 220.

The processing circuitry 102 can request the logic device 106 perform sparse matrix factorization, at operation 222. The operation 222 can include the processing circuitry 102 writing a specified data value to the control register 110 of the logic device 106. At operation 224, the memory 104 (the DMA controller 114 coupled to the memory 104) can perform a data transfer of the sparse matrix, A.

The logic device 106 can perform matrix factorization on the sparse matrix at operation 226. More details regarding matrix factorization are provided elsewhere herein. The operations 226 can include a nonlinear optimization technique discussed elsewhere herein. The logic device 106 can be configured (e.g., via VHDL or the like) to perform the nonlinear optimization technique.

The results of performing the nonlinear optimization technique can be written to the memory 104 (e.g., via the DMA controller 114), at operation 228. After determining the results, the logic device 106 can assert a signal on a physical pin of the processing circuitry 102. The ISR 332 can be monitoring the electrical state of the pin. The ISR 332 can issue an interrupt to the processing circuitry 102 in response to detecting the assertion of the pin. The processing circuitry 102 can then, sometime after the interrupt, at operation 234, retrieve operation results. The operation results can include L, D, $D_{inv}$, P and S, as discussed below.

A nonlinear optimization technique can determine a minimum of a vector (called a nonlinear cost function). In mathematical terms, the nonlinear optimization technique tries to solve $$\min_x f(x).$$

The solution can be subject to nonlinear equality constraints, $C_e(x)=k$ and/or nonlinear inequality constraints $s_L \leq C_i(x) \leq S$. The solution can be subject to bounds on x, $x_L \leq x \leq x_u$. In solving the nonlinear optimization problem, a sparse matrix decomposition can be performed.

Given a sparse matrix A and a scaled matrix M (e.g., A=SMS), a sparse matrix decomposition attempts to find matrices, L, D, P, and S such that:

$$P^T SASP = LDL^T$$

Where T represents a transpose of the matrix, L is a lower triangular matrix, D is a block diagonal matrix (e.g., 1×1 or 2×2 blocks along diagonal that can be non-zero and the remaining entries zero), P is a permutation matrix that helps reduce fill-in on L during factorization, and S is a scaling matrix. Transposing a matrix means to make the rows the columns and the columns the rows.

Scaling M by scaling matrix, S, such that A=SMS, provides better numerical stability for pivot selection and factorization. The scaling matrix, S, can be an N×N diagonal matrix. The entries of the scaling matrix can be $$s_{jj} = \frac{1}{\mathrm{sqrt}(\max|m_{ij}|) \in 1},$$

2, . . . , N, where $m_{ij}$ are the entries of M.

A goal of pivot ordering can be to find a permutation matrix, P, such that factorizing $PMP^T$ has less fill-in than factorizing matrix M. A permutation matrix is a matrix whose entries are either one (1) or zero (0), such that determinate of P is one and $PP^T$ is an identity matrix. Fill-in of a matrix is a non-zero entry in $L_{ij}$, where $(PMP^T)_{ij}$ is zero (o). More fill-in means more space is required for L, as well as more operations to perform during factorization of M.

An initial pivot ordering can be determined using an approximate minimum degree (AMD) technique or a previous factorization pivot order, to come up with an initial pivot ordering. The pivot ordering can be chosen to reduce fill-in on L during factorization (e.g., to keep L as sparse as possible).

Using the initial pivot ordering as a starting point, each potential 1×1 and 2×2 pivot option can be numerically evaluated until the entire matrix M has been factorized. For each selected 1×1 and 2×2 pivot block, factorization can be performed and P can be updated accordingly. Pivot ordering can decrease fill-in of L, but pivot ordering does not necessarily provide numerical stability during factorization.

Pivot selection starts with a current pivot ordering and then chooses 1×1 and 2×2 pivots based on certain criteria being met. An example pivot ordering and selection technique is summarized here.

If pivot i is being evaluated, determine $A(:,i)^{(k)}$ (fully-summed column i that accounts for all previous factorizations, a diagonal value of column i, $A(i, i)^{(k)}$, and a largest off-diagonal value of column i. During factorization, $L^{(k)}$ and $[(LD)^T]^{(k)}$ can be determined. Then $A^{(k)}$ can be determined as:

$$A^{(k)} = A^{(0)} - L^{(k)}[(LD)^{(k)}]^T = A^{(0)} - L^{(k)}W^{(k)}$$

where $A^{(k)}$ may never be fully formed, such as by only forming the columns of $A^{(k)}$ that are needed for pivot selection. After a pivot is chosen, L can be updated as $(LD)^T = W$. On block factorization iteration k, a 1×1 pivot i can be chosen as:

$$\forall A(:,i)^{(k)} \neq 0$$

$$L(:,k) = A(:,i)^{(k)}/A(i,i)^{(k)}$$

$$W(k,:) = A(:,i)^{(k)}$$

On block factorization iteration k, 2×2 pivots i and j can be chosen as:

$$\forall A(:,i)^{(k)} \neq 0 \text{ or } \forall A(:,j)^{(k)} \neq 0$$

$$L(:,k) = (A(:,i)^{(k)} A(j,j)^{(k)} - A(j,i)^{(k)} A(:,j)^{(k)})/(A(i,i)^{(k)} A(j,j)^{(k)} - [A(j,i)^{(k)}]^2)$$

$$L(:,k+1) = (A(i,i)^{(k)}A(:,j)^{(k)} - A(j,i)^{(k)}A(:,i)^{(k)})/$$
$$(A(i,i)^{(k)}j)^{(k)} - [A(j,i)^{(k)}]^2)$$

$$\forall A(:,i)^{(k)} \neq 0$$

$$W(k,:) = A(:,i)^{(k)}$$

$$\forall A(:,j)^{(k)} \neq 0$$

$$W(k+1,:) = A(:,i)^{(k)}$$

To compute a column the following equation can be used:

$$A(:,i)^{(k)} = A(:,i)^{(0)} - L^{(k)}W(:,i)^{(k)}$$

Figure 4:
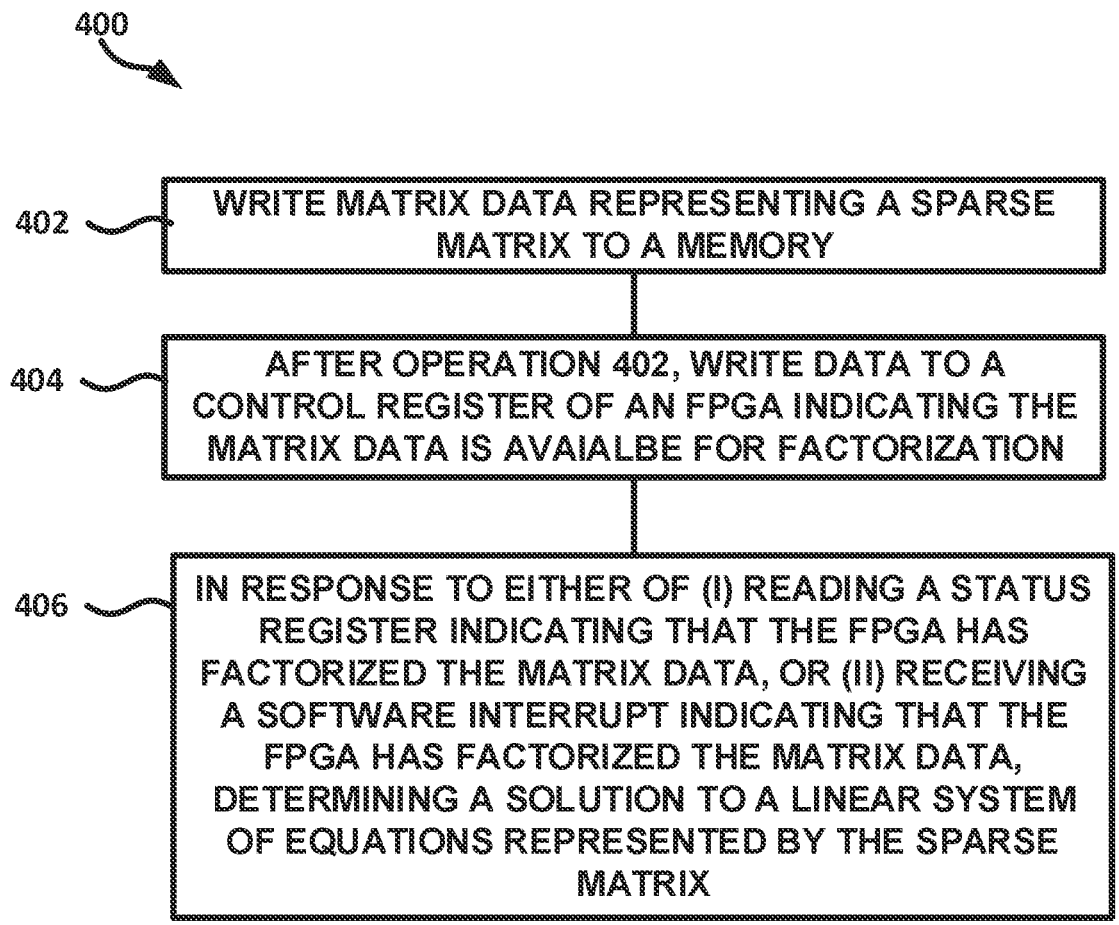
FIG. 4 illustrates, by way of example, a diagram of an embodiment of a method for improved sparse matrix factorization.

FIG. 4 illustrates, by way of example, a diagram of an embodiment of a method 400 for improved sparse matrix factorization. The method 400 can be implemented using one or more of the components or operations of FIGS. 1-3. The method 400 as illustrated includes writing, by a central processing unit (CPU), matrix data representing a sparse matrix to a memory, at operation 402; after writing the matrix data to the memory, writing data to a control register of a field programmable gate array (FPGA) indicating that the matrix data is available for factorization, at operation 404; and in response to either of (i) reading a status register indicating that the FPGA has factorized the matrix data, or (ii) receiving a software interrupt indicating that the FPGA has factorized the matrix data, determining, by the CPU, a solution to a linear system of equations represented by the sparse matrix, at operation 406.

The method 400 can further include, after writing the matrix data to the memory, polling the status register of the FPGA to determine whether the results are available. The method 400 can further include, in response to the status register including data indicating the operation results are available, retrieving the operation results from the memory.

The method 400 can further include, wherein the matrix is indefinite. The method 400 can further include performing an operation based on the solution. The method 400 can further include communicating the matrix data to a direct memory access (DMA) controller coupled between the FPGA and a memory, the DMA controller configured to manage FPGA access to the memory.

Figure 5:
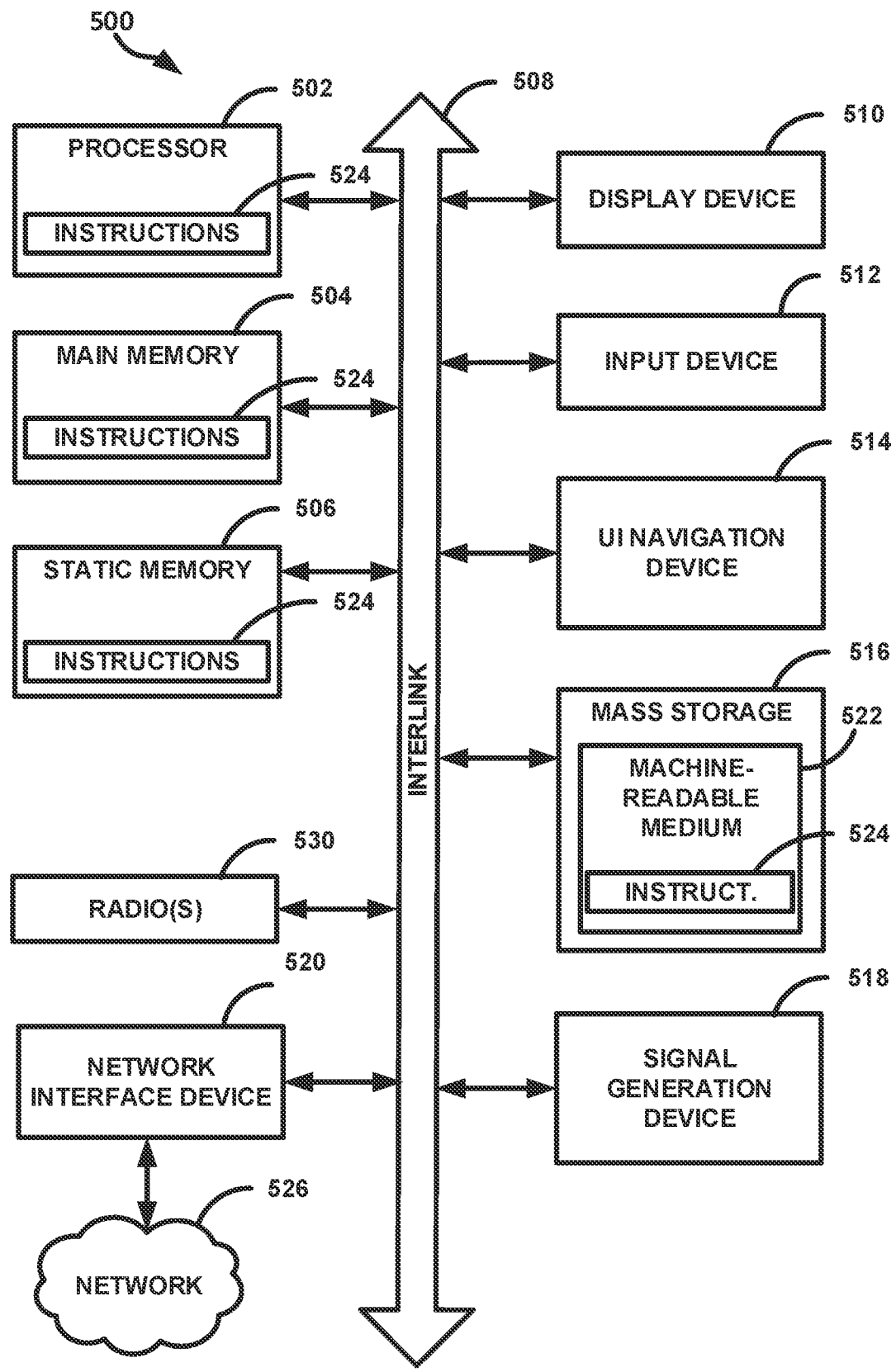
FIG. 5 illustrates, by way of example, a block diagram of an embodiment of a machine in the example form of a computer system within which instructions, for causing the machine to perform any one or more of the methodologies discussed herein, may be executed.

FIG. 5 illustrates, by way of example, a block diagram of an embodiment of a machine in the example form of a computer system 500 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a mass storage unit 516, a signal generation device 518 (e.g., a speaker), a network interface device 520, and a radio 530 such as Bluetooth, WWAN, WLAN, and NFC, permitting the application of security controls on such protocols.

The mass storage unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a device comprising a memory, a field programmable gate array (FPGA), a central processing unit (CPU) configured to write matrix data representing a sparse matrix to the memory and after writing the data to the memory, write data to a control register of the FPGA indicating the matrix data is available for factorization, and in response to the CPU writing the data to the control register, the FPGA configured to factorize the matrix data and write results of the factorization to the memory.

In Example 2, Example 1 can further include, wherein the FPGA is further configured to, after writing results of the factorization to the memory, write data to a status register of the FPGA indicating the operation results are available.

In Example 3, at least one of Examples 1-2 can further include, wherein the CPU is further configured to, after writing the matrix data to the memory, poll the status register of the FPGA to determine whether the results are available.

In Example 4, at least one of Examples 1-3 can further include, wherein the CPU is further configured to, in response to the status register including data indicating the operation results are available, retrieve the operation results from the memory.

In Example 5, at least one of Examples 1-4 can further include, wherein the matrix is indefinite.

In Example 6, at least one of Examples 1-5 can further include, wherein the processing circuitry is further configured to perform an operation based on the operation results.

In Example 7, at least one of Examples 1-6 can further include a direct memory access (DMA) controller coupled between the FPGA and the memory, the DMA controller configured to manage FPGA access to the memory.

In Example 8, at least one of Examples 1-7 can further include, wherein the processing circuitry is further configured to compress the matrix data before writing the matrix data to the memory.

Example 9 includes a non-transitory machine-readable medium including instructions that, when executed by a machine, cause the machine to perform operations for efficient sparse matrix factorization, the operations comprising writing matrix data representing a sparse matrix to a memory, after writing the matrix data to the memory, write data to a control register of a field programmable gate array (FPGA) indicating the matrix data is available for factorization, and in response to either of (i) reading a status register indicating that the FPGA has factorized the matrix data, or (ii) receiving a software interrupt indicating that the FPGA has factorized the matrix data, determining a solution to a linear system of equations represented by the sparse matrix.

In Example 10, Example 9 can further include, wherein the operations further include, after writing the matrix data to the memory, poll the status register of the FPGA to determine whether the results are available.

In Example 11, at least one of Examples 9-10 can further include, wherein the operations further include, in response to the status register including data indicating the operation results are available, retrieve the operation results from the memory.

In Example 12, at least one of Examples 9-11 can further include, wherein the matrix is indefinite.

In Example 13, at least one of Examples 9-12 can further include, wherein the operations further include performing an operation based on the solution.

In Example 14, at least one of Examples 9-13 can further include, wherein the operations further include communicating the matrix data to a direct memory access (DMA) controller coupled between the FPGA and a memory, the DMA controller configured to manage FPGA access to the memory.

Example 15 can include a method for performing operations of at least one or Examples 9-14.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:
   a memory;
   a field programmable gate array (FPGA);
   a central processing unit (CPU) configured to write matrix data representing a sparse matrix to the memory and after writing the data to the memory, write data to a control register of the FPGA indicating the matrix data is available for factorization; and
   in response to the CPU writing the data to the control register, the FPGA configured to:
     factorize the matrix data and write results of the factorization to the memory; and
     after writing factorization results of the factorization to the memory, write data to a status register of the FPGA indicating factorization results are available.

2. The device of claim 1, wherein the CPU is further configured to, after writing the matrix data to the memory, poll the status register of the FPGA to determine whether the factorization results are available.

3. The device of claim 2, wherein the CPU is further configured to, in response to the status register including data indicating the factorization on results are available, retrieve the operation results from the memory.

4. The device of claim 3, wherein the matrix data represents an indefinite matrix.

5. The device of claim 4, wherein the CPU is further configured to perform an operation based on the factorization results.

6. The device of claim 1, further comprising a direct memory access (DMA) controller coupled between the FPGA and the memory, the DMA controller configured to manage FPGA access to the memory.

7. The device of claim 1, wherein the CPU is further configured to compress the matrix data before writing the matrix data to the memory.

8. A non-transitory machine-readable medium including instructions that, when executed by a machine, cause the machine to perform operations for efficient sparse matrix factorization, the operations comprising:
   writing matrix data representing a sparse matrix to a memory;
   after writing the matrix data to the memory, write data to a control register of a field programmable gate array (FPGA) indicating the matrix data is available for factorization,
   in response to either of (i) reading a status register indicating that the FPGA has factorized the matrix data, or (ii) receiving a software interrupt indicating that the FPGA has factorized the matrix data, determining a solution to a linear system of equations represented by the sparse matrix; and after writing the matrix data to the memory, poll the status register of the FPGA to determine whether factorization results are available.

9. The non-transitory machine-readable medium of claim 8, wherein the operations further include, in response to the status register including data indicating the factorization results are available, retrieve the operation results from the memory.

10. The non-transitory machine-readable medium of claim 9, wherein the matrix data represents an indefinite matrix.

11. The non-transitory machine-readable medium of claim 10, wherein the operations further include performing an operation based on the solution.

12. The non-transitory machine-readable medium of claim 8, wherein the operations further include communicating the matrix data to a direct memory access (DMA) controller coupled between the FPGA and a memory, the DMA controller configured to manage FPGA access to the memory.

13. A method comprising:
    writing, by a central processing unit (CPU), matrix data representing a sparse matrix to a memory;
    after writing the matrix data to the memory, writing data to a control register of a field programmable gate array (FPGA) indicating the matrix data is available for factorization;
    in response to either of (i) reading a status register indicating that the FPGA has factorized the matrix data, or (ii) receiving a software interrupt indicating that the FPGA has factorized the matrix data, determining, by the CPU, a solution to a linear system of equations represented by the sparse matrix; and
    after writing the matrix data to the memory, polling the status register of the FPGA to determine whether factorization results are available.

14. The method of claim 13, further comprising, in response to the status register including data indicating the factorization results are available, retrieving the factorization results from the memory.

15. The method of claim 14, wherein the matrix data represents an indefinite matrix.

16. The method of claim 15, further comprising performing an operation based on the solution.

17. The method of claim 16, further comprising communicating the matrix data to a direct memory access (DMA) controller coupled between the FPGA and a memory, the DMA controller configured to manage FPGA access to the memory.

* * * * *